US011775747B1

(12) United States Patent
Religa et al.

(10) Patent No.: US 11,775,747 B1
(45) Date of Patent: Oct. 3, 2023

(54) METHOD AND SYSTEM OF GENERATING A DOCUMENT TEMPLATE

(71) Applicant: Microsoft Technology Licensing, LLC, Redmond, WA (US)

(72) Inventors: Tomasz Lukasz Religa, Seattle, WA (US); Huitian Jiao, Snoqualmie, WA (US); Max Wang, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/068,216

(22) Filed: Dec. 19, 2022

(51) Int. Cl.
*G06N 3/08* (2023.01)
*G06F 40/186* (2020.01)
*G06T 11/60* (2006.01)

(52) U.S. Cl.
CPC ........... *G06F 40/186* (2020.01); *G06T 11/60* (2013.01); *G06T 2200/24* (2013.01)

(58) Field of Classification Search
CPC .... G06F 40/186; G06T 11/60; G06T 2200/24
See application file for complete search history.

(56) References Cited

U.S. PATENT DOCUMENTS

| | | | |
|---|---|---|---|
| 10,867,120 B1* | 12/2020 | Bradley | G06F 40/186 |
| 11,113,453 B1* | 9/2021 | Douglas | G06F 3/011 |
| 11,182,837 B2* | 11/2021 | Sabbah | G06N 20/00 |
| 11,270,070 B1* | 3/2022 | Douglas | G06Q 30/0271 |
| 2020/0320165 A1* | 10/2020 | Srinivasan | G06V 30/414 |
| 2021/0150263 A1* | 5/2021 | Corwin | G06F 16/148 |
| 2021/0240909 A1* | 8/2021 | Ghiaus | G06F 16/9538 |

OTHER PUBLICATIONS

Sola, et al., "Image-to-Image Translation with Conditional Adversarial Networks", In repository of arXiv:1611.07004v3, Nov. 26, 2018, 17 Pages.

* cited by examiner

*Primary Examiner* — Hassan Mrabi
(74) *Attorney, Agent, or Firm* — NovoTechIP International PLLC

(57) ABSTRACT

A system and method and for generating a template based on a page of a document includes receiving a request to create the template for the document, providing a page of the document as an input to a trained machine-learning (ML) model, where the trained machine-learning model is trained to automatically generate target pages for the document based on a received page and the page includes a background image and content, and receiving target pages for the document from the ML model. Each target page has a distinct layout and includes a modified background image and one or more placeholders for content and a template for the document is generated from the one or more target pages and provided for display on a user interface screen associated with the document.

20 Claims, 8 Drawing Sheets

METHOD AND SYSTEM OF GENERATING A DOCUMENT TEMPLATE

BACKGROUND

It is common for users of digital devices to create documents consisting of multiple pages, where the different pages have a recurring theme or design. For example, users may use template to create a presentation document consisting of multiple pages having different types of content, where the multiple pages offer a consistent look and feel. Some design and presentation applications provide pre-made templates for users to select for efficient creation of documents. For example. Microsoft PowerPoint® offers a gallery of many different types of templates that a user can select to apply to a current presentation slide deck or to create a new presentation with. However, there are many instances in which the pre-made templates provided by an application are not suitable for a user's particular needs. For example, users may have a need or desire to use a specific image as their background. In another example, the provided templates may not correspond with the user's intended design or audience. In yet another example, the user may prefer to generate their own design rather than using standard template designs. For example, the user may desire to create a customized look as opposed to the general or default designs provided by the pre-made templates.

A user may attempt to generate their own design for a design document by using or creating a desired image to generate a title page for the document. However, when the user generates or uses an image to create the title page for a presentation or other type of design document having multiple pages, the same image may not be appropriate for use on subsequent pages of the document. For example, the title page often includes very little text and as such can include larger shapes, while the subsequent pages may need more blank space for content. Yet, the user often desires to keep a consistent look and feel for the entire document. As a result, to generate multiple pages, the user would need to spend a significant amount of time revising the image and/or design of the title page or input image to create the subsequent pages of the document. However, while a user can utilize an already generated image to create a title page, the same user may not have the skills required for modifying the image for subsequent pages of the document. Furthermore, even if the user is proficient in image editing, the process of generating images that look similar to but are not the same as an input image and correspond to the needs of subsequent pages in the document can be very time-consuming.

Hence, there is a need for improved systems and methods of automatically generating templates based on an input image and/or document page.

SUMMARY

In one general aspect, the instant disclosure presents a data processing system having a processor and a memory in communication with the processor wherein the memory stores executable instructions that, when executed by the processor, cause the data processing system to perform multiple functions. The functions may include accessing a page of a document; providing an image of the page as an input to a trained machine-learning (ML) model, the trained machine-learning model being trained to automatically generate target pages for the document based on the page; receiving one or more target pages for the document as an output of the ML model, the target pages including a background image and one or more placeholders for content; generating a template for the document from the one or more target pages; and providing the template for display on a user interface screen associated with the document.

In yet another general aspect, the instant disclosure presents a method for generating a template based on a first page of a document. In some implementations, the method includes receiving a request to create the template for the document, providing a page of the document as an input to a trained ML model, where the trained machine-learning model is trained to automatically generate target pages for the document based on a received page and the page includes a background image and content, and receiving target pages for the document from the ML model. Each target page has a distinct layout and includes a modified background image and one or more placeholders for content and a template for the document is generated from the one or more target pages and provided for display on a user interface screen associated with the document.

In a further general aspect, the instant application describes a non-transitory computer readable medium on which are stored instructions that when executed cause a programmable device to perform functions of receiving an image; providing the image as an input to a trained ML model, the trained machine-learning model being trained to automatically generate target pages for a document based on an input image; receiving one or more target pages for the document as an output of the ML model, the target pages including a background image and one or more placeholders for content; generating a template for the document from the one or more target pages; and providing the template for display on a user interface screen associated with the document.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1:
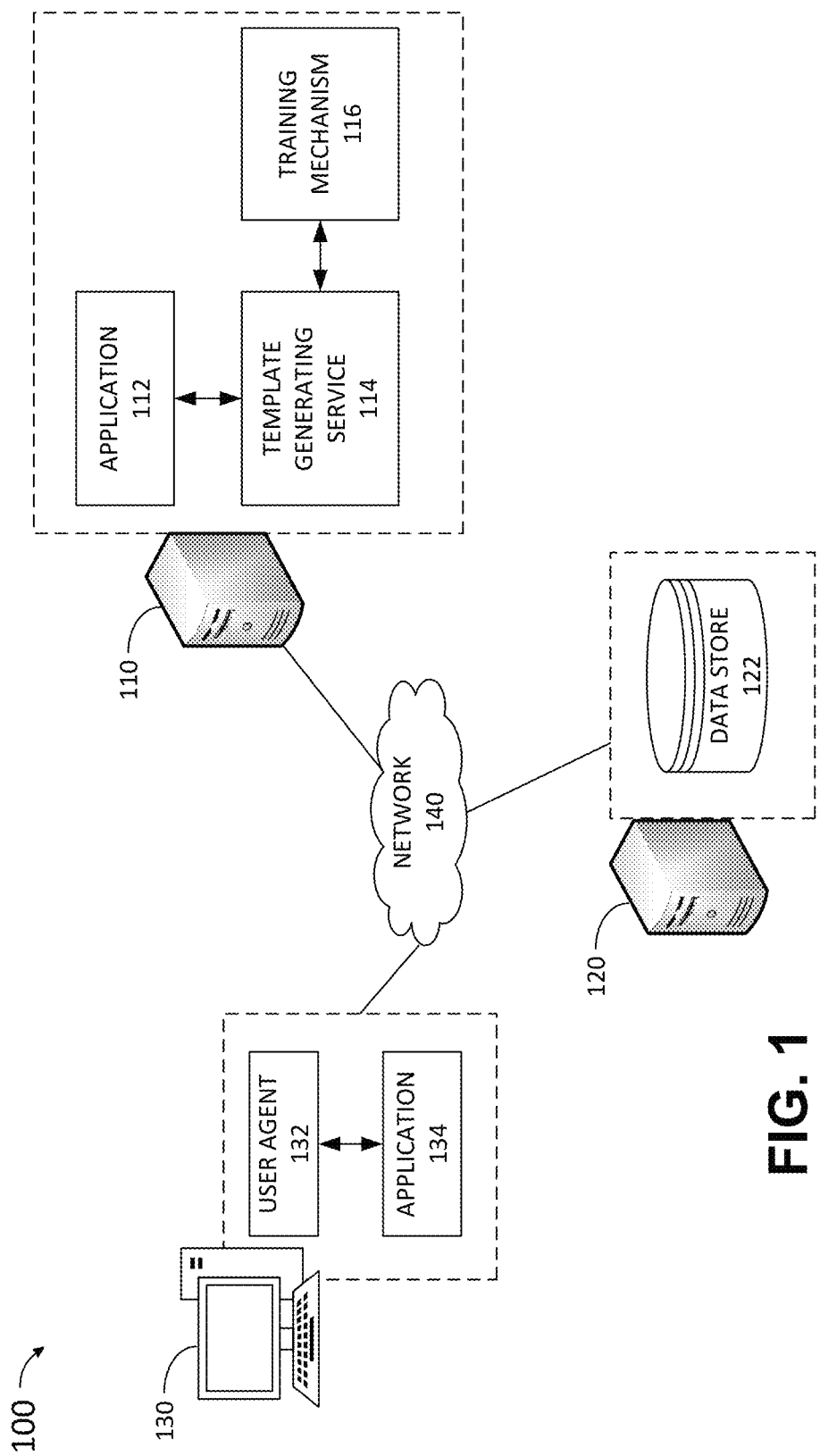
FIG. 1 depicts an example system upon which aspects of this disclosure may be implemented.

Users of design and/or presentation applications often create documents containing multiple pages. In most cases, users prefer that the various pages of the same document have a consistent theme, look and/or feel. This may be achieved by modifying a background image used for one of the pages of the document (e.g., the first page) to accommodate the content of the remaining pages. For example, an image used for a title page of the document is modified to provide more space for a page having a lot of text. To accommodate this, some design and/or presentation applications offer pre-made templates for generating and/or designing documents. Each template often includes a title page which consists of a background image and placeholder boxes for inserting content such as text, and one or more additional pages having layouts that are different than the title page and a variation or some element of the background image. The different pages of the templates have distinct layouts but provide a similar look and feel based on consistency of the images between the pages. While the templates provide easy to use options for users, they are often limited to standard type of documents, which may not be useful for all users and limits their choice. Thus, there exists a technical problem of templates being provided to users from a pre-existing set, which restricts users' choice.

Many users desire to generate a custom document or one that uses a specific image as the background. In such instances, the user may generate a title page which utilizes a given image as the background. To generate the remaining pages, however, the user would need to modify the image and/or create new images that have a similar look as that of the image used for the first page. This requires a significant amount time and user experience. As such, users are restricted to either using standard templates offered by an application or spending a significant amount of time and resources in generating a full document based on an input image. There are currently no means for generating a template based on a given input image. Thus, there exists another technical problem of lack of mechanisms for generating a document template based on a user provided input image.

To address these technical problems and more, in an example, this description provides technical solutions for receiving an input image and automatically generating one or more document templates that include a plurality of pages having a similar look and feel based on the input image. Each page of the generated templates includes a variation and/or an element of the input image and one or more placeholders for content. This may be achieved by utilizing an ML model that receives the input page as an input and provides one or more templates having a plurality of pages as the output. The ML model may include a trained image-to-image model that generates images of target layouts based on the image in the input page. In some implementations, the input page is a title page having a background image and a given layout (e.g., one or more placeholders, or text boxes positioned at specific locations). The output pages include background images providing a similar look and feel as the input image and designs corresponding to target layouts. The ML model is trained by using a training dataset of pre-existing templates that include a title page and one or more additional pages having a target layout and a background image based on the image of the title page. The technical solution may be provided as a service offered by an application and can enable a user to provide an image to the application as an input and receive a document (e.g., a presentation deck) having multiple pages that are visually pleasing to the user and consistent with the input image as the output.

The technical solution described herein addresses the technical problem of inability of current mechanisms to automatically generate a document template based on an input image. The technical solution allows a user to quickly and efficiently convert an input image or title page to an editable document, where the document includes a plurality of pages having target layouts that provide a look consistent with the input image. The technical effects at least include (1) improving the efficiency and accuracy of generating a document having a plurality of pages based on an image; (2) automating the process of generating document templates; and (3) automatically generating a variety of images from an input image.

As will be understood by persons of skill in the art upon reading this disclosure, benefits and advantages provided by such implementations can include, but are not limited to, a technical solution to the technical problems of lack of mechanisms for efficient and user-friendly creation of documents having multiple pages based on an input image. Technical solutions and implementations provided herein offer a mechanism for automatically converting an input image or title page to an editable document that includes a plurality of pages having target layouts in an efficient manner. The benefits made available by these technology-based solutions provide a user-friendly mechanism for generating new designs and presentation documents.

As used herein, the term "document," refers to an electronic document that includes multiple pages, where one or more pages include an image. Examples of documents include presentation documents (e.g., PowerPoint documents), or design documents (e.g., documents generated by Microsoft Designer). The term "template" as used herein refers to a document including a plurality of pages, where each page has a given layout and includes a background image.

FIG. 1 illustrates an example system 100, upon which aspects of this disclosure may be implemented. The system 100 includes a server 110, which itself includes an application 112, a template generating service 114, and a training mechanism 116. While shown as one server, the server 110 may represent a plurality of servers that work together to deliver the functions and services provided by each service or application included in the server 110. The server 110 may also operate as a cloud-based server for offering template generating services in one or more applications such as application 112 and/or application 134. The server 110 may also operate as a shared resource server located at an enterprise accessible by various computer client devices such as a client device 130.

The server 110 includes and/or executes a template generating service 114, which receives and processes a request for generating a document template based on an input page. The request is received from an application such as the application 112 or 134. The request may be an explicit request submitted by a user via a user interface (UI) associated with the application 112 or 134. For example, the user may have generated a title page for a document they are interested in creating and may submit a request for creating a template for the document based on the title page. Alternatively, the request is transmitted automatically via the application 112 or 134 to provide automatic template generation for a user. For example, a user may create a title page in a presentation application and upon determining that the title page is complete and/or the title page includes a design or image, the application 112 or 134 transmits a request to the template generating service 114 for generating a template based on the title page. In either scenario, the request includes a copy of the title page. Once the request is received, the template generating service 114 examines the received page and extract various features to generate one or more templates based on the received page. This is achieved by utilizing one or more ML models that perform image-to-image conversion and/or determine appropriate locations of placeholders for target layouts. The internal structure of and data flow between the various elements of the template generating service 114 is discussed in greater detail with respect to FIG. 2.

One or more ML models implemented by the template generating service 114 are trained by the training mechanism 116. The training mechanism 116 may use training data sets stored in the data store 122 to provide initial and ongoing training for each of the models. Alternatively, or additionally, the training mechanism 116 may use training data sets from elsewhere. In some implementations, the training mechanism 116 uses labeled training data to train one or more of the models via deep neural network(s) or other types of ML models. In other implementations, the training mechanism 116 uses unlabeled training data. The initial training may be performed in an offline stage. Additionally, and/or alternatively, the one or more ML models may be trained using batch learning.

As a general matter, the methods and systems described herein may include, or otherwise make use of one or more ML model to generate one or more output images based on an input image. ML generally involves various algorithms that can automatically learn over time. The foundation of these algorithms is generally built on mathematics and statistics that can be employed to predict events, classify entities, diagnose problems, and model function approximations. As an example, a system can be trained using data generated by a ML model in order to identify patterns in images to identify similarities between fonts. Such training may be made following the accumulation, review, and/or analysis of data. Such data is configured to provide the ML algorithm (MLA) with an initial or ongoing training set. In addition, in some implementations, a user device can be configured to transmit data captured locally during use of relevant application(s) to a local or remote ML algorithm and provide supplemental training data that can serve to fine-tune or increase the effectiveness of the MLA. The supplemental data can also be used to improve the training set for future application versions or updates to the current application.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying MLAs, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. Moreover, different training approaches may be used for training different ML models, such as, but not limited to, selection of training, validation, and test sets of training data, ordering and/or weighting of training data items, or numbers of training iterations. One or more of the resulting multiple trained ML models is selected based on factors such as, but not limited to, accuracy, computational efficiency, and/or power efficiency. In some implementations, a single trained ML model is produced.

The training data may be occasionally updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

In collecting, storing, using and/or displaying any user data used in training ML models, care may be taken to comply with privacy guidelines and regulations. For example, options may be provided to seek consent (e.g., opt-in) from users for collection and use of user data, to enable users to opt-out of data collection, and/or to allow users to view and/or correct collected data.

The system 100 includes a server 120 which may be connected to or include the data store 122 which functions as a repository in which databases relating to training models, document templates and/or images are stored. Although shown as a single data store, the data store 122 is representative of multiple storage devices and data stores which may be accessible by one or more of the template generating service 114, training mechanism 116, and application 112.

The client device 130 is connected to the server 110 via a network 140. The network 140 may be a wired or wireless network(s) or a combination of wired and wireless networks that connect one or more elements of the system 100. The client device 130 may be a personal or handheld computing device having or being connected to input/output elements that enable a user to interact with various applications (e.g., application 112 or application 134). Examples of suitable client devices 130 include but are not limited to personal computers, desktop computers, laptop computers, mobile telephones, smart phones, tablets, phablets, smart watches, wearable computers, gaming devices/computers, televisions, and the like. The internal hardware structure of a client device is discussed in greater detail with respect to FIGS. 6 and 7.

The client device 130 includes a local application 134. The application 134 is a computer program executed on the client device that configures the device to be responsive to user input to allow a user to interactively create, edit, and/or review a document. The application 134 may also enable the user to interactively submit a request for creating a template based on an input page. Examples of suitable applications include, but are not limited to, a presentation application, and a design application.

In some examples, the application used to submit a request for template generation is executed on the server 110 (e.g., application 112) and provided via an online service. In some implementations, web applications communicate via the network 140 with a user agent 132, such as a browser, executing on the client device 130. The user agent 132 may provide a UI that allows the user to interact with the application 112. User and document data from the application 134 or application 112 is provided via the network 140 to the template generating service 114 for use in automatic creation of templates.

In some implementations, the client device 130 includes a local template generating engine for performing offline template creation. The local template generating engine may be a light (e.g., simplified) version of the template generating service 114 that enables automatic creation of templates locally. In an example, the local template generating engine receives a page as an input, utilizes a light version of the image-to-image conversion ML model for generating target images, and creates one or more templates based on the generated images.

Figure 2:
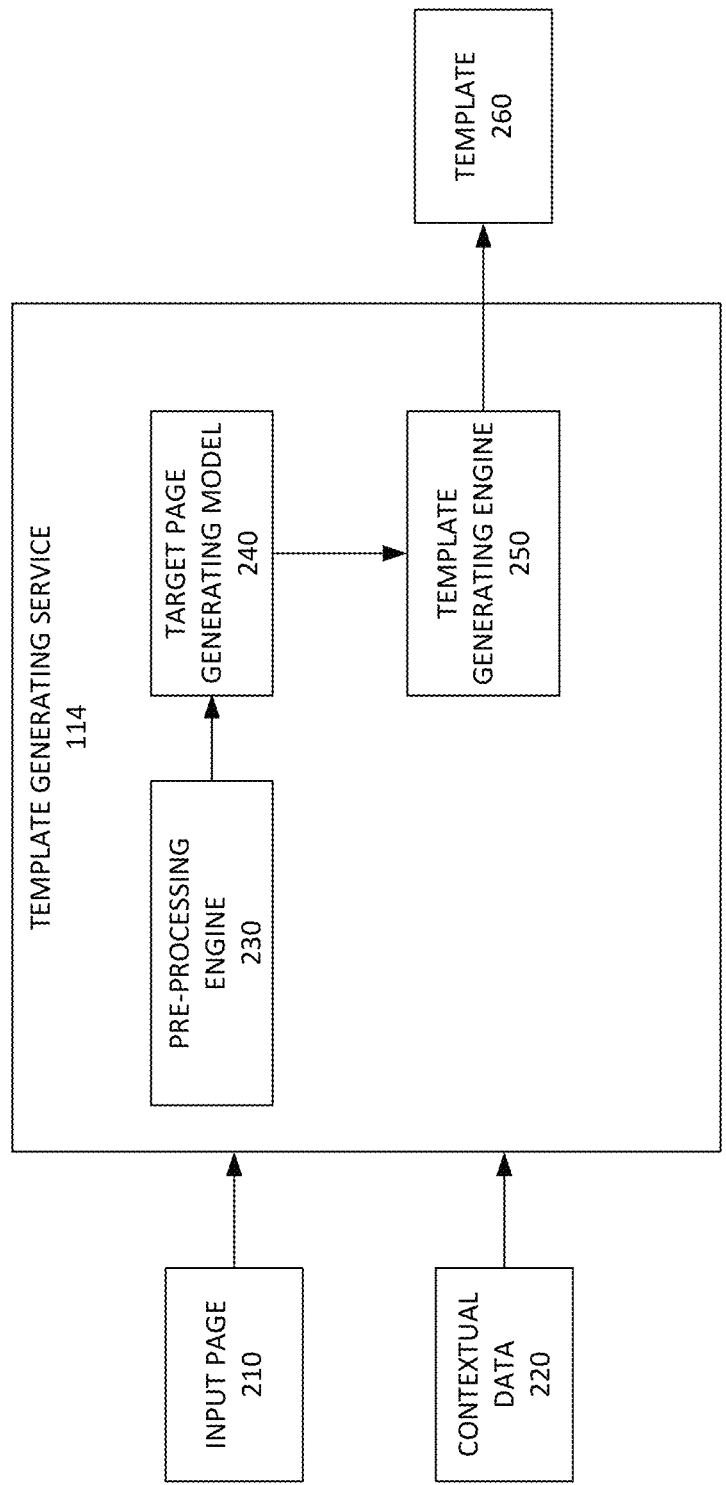
FIG. 2 depicts an example of some elements involved in automatically generating templates based on an input image.

FIG. 2 depicts an example of some of the elements involved in automatically creating a document template based on an input page containing an image. Once the user has completed creating a first or title page for a document having multiple pages, an explicit or automatic request for creating a template based on the input page is submitted to the template generating service 114. The request may include the input page 210 or the template generating service 114 may retrieve the input page 210 upon receiving the request. Once received, the template generating service 114 utilizes a pre-processing engine 230, target page generating model 240, and template generating engine 250 to process the received input page 210 and generate a template 260 based on the input page 210.

In some implementations, the input page 210 is provided to the pre-processing engine 230. The pre-processing engine 220 examines the input page 210 to detect various objects in the input page 210. To achieve this, the pre-processing engine 230 may examine the properties of various elements in the input page to determine for each element, the type of element, the location of the element and/or the size of the element. The elements included in the input image may include a background image, one or more text boxes, other images that are overlayed on the background image (e.g., an image of an icon such as a logo or an emoticon), multimedia elements (e.g., a GIF) and the like. In some implementations, the pre-processing engine 230 determines the type of element by examining properties such as object property type and/or file extensions for inserted elements. In other implementations, the pre-processing engine 230 makes use of one or more object detection ML models for detecting the type of element. Once the elements are identified, the pre-processing engine 230 identifies the location of each element on the page and/or the size of elements such as text boxes. In some implementations, the pre-processing engine 230 removes all elements of the input image 210 except for the background image element before transmitting the input page 210 to the target page generating model 240. In this manner, the target page generating model 240 can generate target pages based on the background image. However, in addition to the background image, the pre-preprocessing engine 230 may also transmit information about one or more of the additional elements in the input page 210, such as the type and location of each of the text boxes and/or overlayed images. The additional information may be used by the target page generating model 240 to determine the type of target page needed and/or predict the type and/or size of placeholders needed on the target pages. Information about additional elements on the input page 210 may also be taken into consideration in determining how to modify the input image to for example leave space for a logo that is likely to be displayed on all the pages. In some implementations, the operations performed by the pre-processing engine 230 are performed by the target page generating model 240 itself and/or the target page generating model 240 can itself identify the various element on the input page 210. As such, in some implementations, the template generating service 114 does not include a pre-processing engine 230.

The target page generating model 240 is a model trained for receiving an input image or an input page containing an input image and generating target pages based on the input page. The target page generating model 240 is or includes an image-to-image conversion ML model that is trained for generating target pages based on a title page. The image-to-image conversion ML model may be a trained image-to-image translation model. In some implementations, a known pre-trained image-to-image translation model is trained on template training datasets to generate the target page generating model 240. The details of training the target page generating model 240 are discussed in greater detail with respect to FIG. 3.

In some implementations, the target page generating model 240 receives an image of the input page 210 and generates the target pages simply based on the input image. This is because the target page generating model 240 may be trained to extract features of the input page to identify the various elements in the image such as text boxes (e.g., for the title), overlayed images (e.g., a logo) and the background image and as such may be able to generate the target pages based on the extracted features. In alternative implementations, the target page generating model 240 receives the input page 210 or the background image of the input page 210 along with information about the various elements present in the input page 210 and generates the target pages based on the background image and/or additional information.

In some implementations, the target page generating model 240 generates a set number of target pages for each input page. The set number of target pages includes a plurality of pages each having a standard layout. The standard layout is determined based on the type of document. For example, a PowerPoint® document may have 9 different types of standard layouts. These include the title only layout, title and content layout, two content layout, one content layout, content with caption layout, picture with caption layout and the like. The target page generating model 240 may thus receive the input page 210 (or input image) and generate 9 target pages, where each target page has one of the 9 standard layouts. In this manner, the target page generating model 240 generates one of each type of layout the user is likely to need for their document. Alternatively, the number of target pages generated and type of layout for each of the target pages varies depending on a variety of factors.

In some implementations, contextual data 220 is received and used by the target page generating model 240 to determine the number and/or types of target pages needed. The contextual data 220 may include user-specific data, document-specific data and/or global data. User-specific data includes information about the user generating the document such as the layout of pages the user generally creates for their documents, the types of automatically generated target pages the user has previously selected for their documents and the like. Document-specific data relates to the type of document being created (e.g., a presentation, a marketing document, an invitation, etc.), the subject matter of the document, and the like. Global data may provide information about users similar to the user and/or global users' use of the application to generate documents. For example, information about the types of layouts used after the title page in a marketing document may be retrieved and used to determine the type of layout needed for the target pages.

The target page generating model 240 utilizes the received input page 210 and/or contextual data 220 to generate one or more target pages. The target pages include background images that are different from but have a consistent look and feel as the background image of the input page 210. Each of the target pages also includes placeholders for inserting content. The types and locations of the placeholders varies and may depend on the layout type of the target page. Furthermore, some parameters associated with the placeholders are determined and/or set based on parameters of the input page 210. For example, a font for text inserted into a placeholder text box may be set to the same font as that used in the input page 210. Furthermore, if the target page has a two-content layout, the target page generating model 240 generates a page having a background image that does not interfere with the location and size of two placeholders on the page for the two-content layout. Furthermore, after generating the background image, the target page generating model 240 places two standard text boxes for the two contents at standard locations on the background image to arrive at the target page. Similarly, for a one content target page, the target page generating model 240 generates an image that corresponds with the size and location of one input box and places a standard input box on the generated image to create the target page. In some implementations, the types and locations of the placeholders varies and depends on the size and type of elements on the input page 210.

Once all of the required target pages for the input page 210 are generated by the target page generating model 240, the target pages may be provided to the template generating engine 250. The template generating engine 250 combines the generated target pages to create a template for the input page 210. This may involve generating a template document from the various target pages. The template document includes the target pages in a given order. The order may be pre-determined or standard and be based on the layout type of the target pages. Alternatively, the order may be determined based on a likelihood of use by the user, in which case, a confidence score associated with each target page may be provided by the target page generating model 240 or a similar ML model that determines the likelihood of use of various layout types by the user and/or for the document.

In some implementations, the target page generating model 240 simply provides the background image for each of the target pages and the template generating engine 250 adds the placeholders in accordance with the layout type of each generated target page. In other implementations, the target page generating model 240 itself generates the document template from the generated target pages. In such an implementation, the template generating service 114 does not include the template generating engine 250.

Once the template is created from the generated target pages, it is provided as an output template 260 by the template generating service 114. The output editable document 280 may be transmitted back to the application from which the request for template creation was received for display to the user. In an example, the generated template is transmitted to the application and automatically applied to the document the user is generating. In another example, the template is displayed on a pane of the UI of the application. In yet another example, the application displays a notification to notify the user of the existence of a template that corresponds to the title page the user has created.

Figure 3:
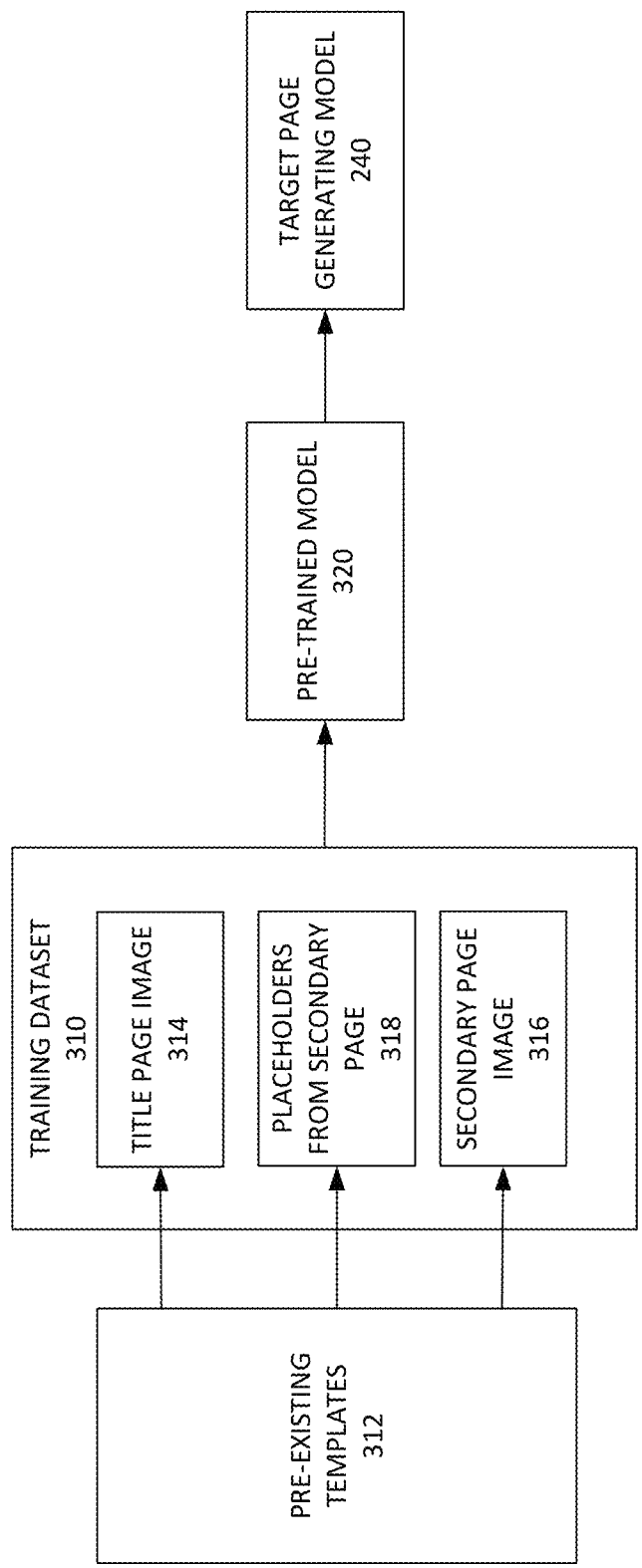
FIG. 3 depicts an example of some elements involved in training a machine-learning (ML) model for automatically generating templates based on an input image.

FIG. 3 depicts how the target page generating model 240 used by the template generating model 240 is trained. The training mechanism uses labeled training datasets stored in a data store such as the data store 122 of FIG. 1 to provide training to a pre-trained model 320. The pre-trained model is an image-to-image translation model. In some implementations, the pre-trained model is trained using sets of masked images and corresponding sketch images. The pre-training creates for all of the training images a semantic latent space which allows the space to be used for tasks of interest.

To fine-tune the pre-trained model 320 to generate target images for a template, a set of pre-existing templates 312 is first generated. The set may be collected from pre-existing templates offered by the application for which the model is being trained. In some implementations, this involves manual review and selection of pre-existing templates that exhibit desirable characteristics such as consistent look and feel of template pages. Once a number of pre-existing templates have been collected to form the pre-existing templates 312, each template in templates 312 is divided into sets of title pages and secondary pages. The training dataset 310 may then be created by generating data pairs that consist of an image of the title page 314 and placeholders from secondary pages 318 as input and the secondary page images 316 as the target. In some implementations, the placeholders from the secondary page 318 are overlayed on the title page to generate the title page image 314. The data pairs are provided to the pre-trained model 320 to train the image-to-image model to receive a given input image and generate target pages as an output. In some implementations the training dataset labels the title page image as the title page and the secondary page image as the target page. Furthermore, the secondary page may be labeled based on its type of layout (e.g., one content, two-content, etc.). In this manner, the target pages may also be generated based on the type of layout needed.

In some implementations, to provide ongoing training, the training mechanism may also use training data sets received from the target page generating model 240. Furthermore, data may be provided from users' use of the automatically generated templates to update one or more of the training datasets in order to provide updated and ongoing training. The model may be initially trained in an offline phase. Once the model is trained, ongoing training or adding of new training data may be done periodically to update the models.

Figure 4A:
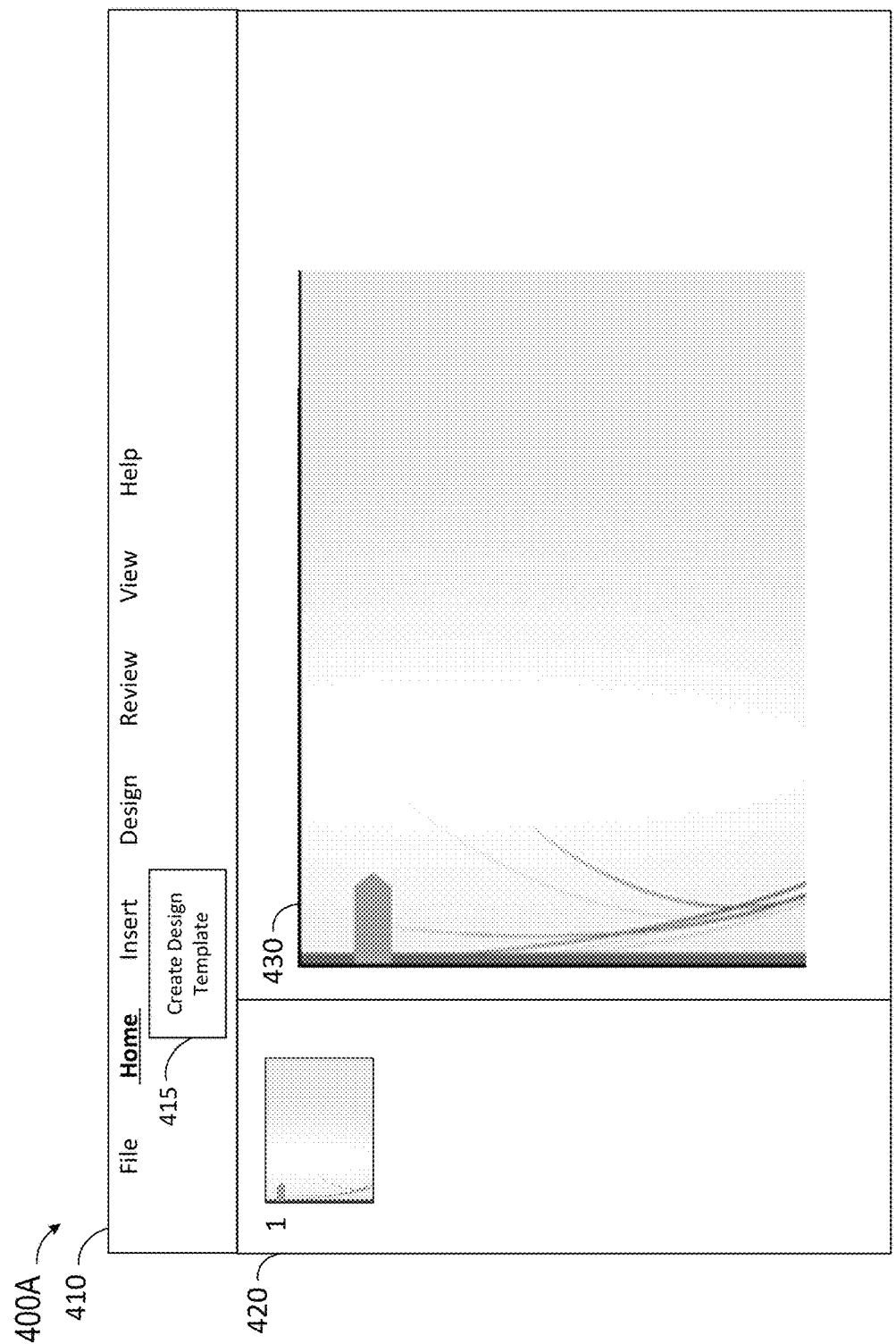
FIGS. 4A-4B depict graphical user interface (GUI) screens of an application or service that provides templates automatically generated based on an input image.
Figure 4B:
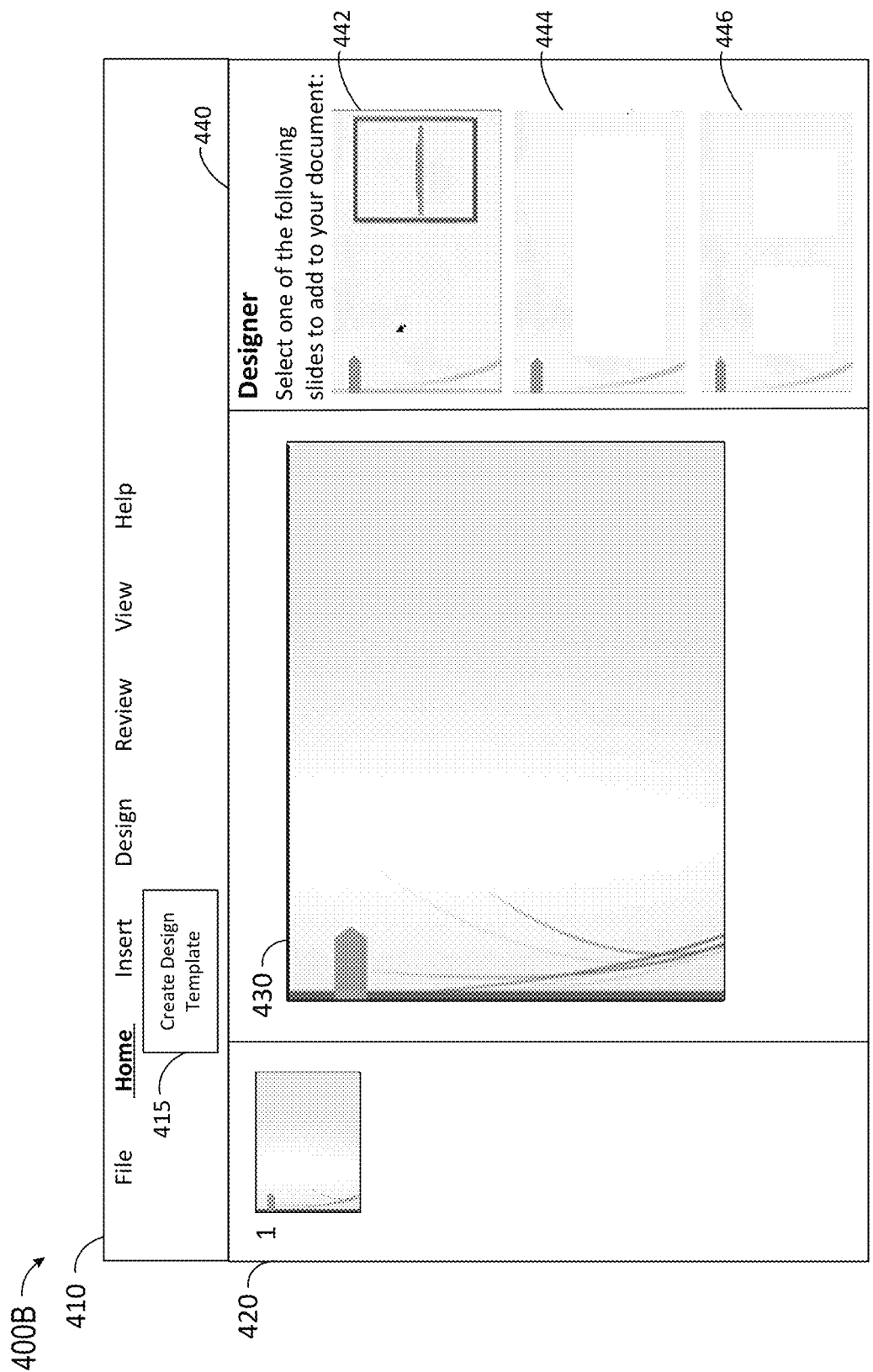

FIGS. 4A-4B depict example GUI screens of an application or service that provides automatically generated templates based on an input image. GUI screen 400A displays an example screen of an application (e.g., Microsoft PowerPoint®) displaying an example document. GUI screen 400A includes a toolbar menu 410 containing various menu options for performing various tasks in the application. For example, the toolbar menu 410 provides options for the user to perform one or more tasks to create or edit the document. GUI screen 400A also includes a thumbnail pane 420 for displaying a thumbnail for each of the slides in the document and a pane 430 for displaying the content of the current page of the document (e.g., displaying the slides one slide at a time). The content may be displayed to the user for viewing and/or editing purposes and may be created by the user. For example, the user may utilize an input device (e.g., a keyboard) to insert input such as text as well as visual content such as images, icons, emoticons, and the like into the pane 430. In an example, the user generates or inserts an image into the first page of the document to generate the page displayed in the pane 430.

As the user creates or edits the page displayed in the pane 430, a UI element may be provided for transmitting a request to generate a template based on the page. The UI element may be any menu option that can be used to indicate a request by the user. In one implementation, the UI element is provided via a menu option such as the menu button 415 in the toolbar menu 410. When the user utilizes an input/output device such as a mouse to click on the menu button 415, a request for automatically generating a document template for the document based on the generated first page is transmitted to a template generating service. Alternatively, the application automatically determines when the user has completed creating the first slide, and transmits a request for generating a template based on the first slide without explicit user request.

Once the generated template pages are received, the application may display the pages in a pane such as the designer pane 440 of GUI screen 400B as depicted in FIG. 4B. The designer pane 440 displays the generated pages 442, 444 and 446 in the designer pane 440. A user may select to add each of the displayed pages by clicking on the page. This results in adding a page to the slide deck. As depicted, the generated pages 442, 444 and 446 have different layouts, but have background images that provide a similar look as that of the first page.

Figure 5:
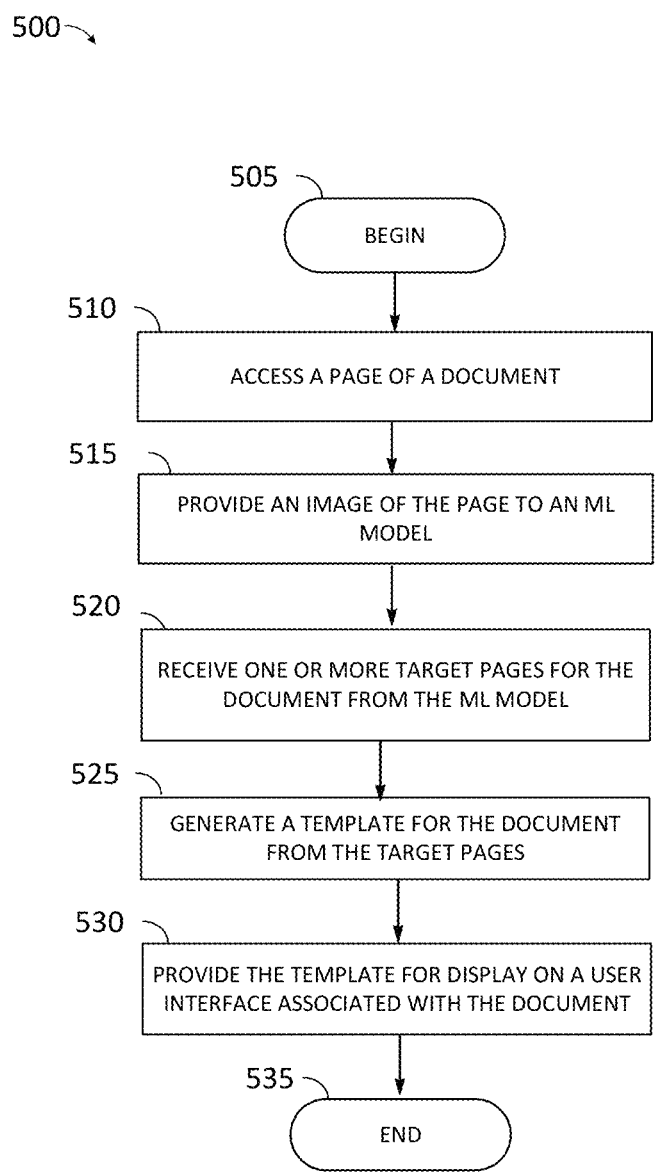
FIG. 5 is a flow diagram depicting an example method for generating a template based on an input page.

FIG. 5 is a flow diagram depicting an exemplary method 500 for generating a template based on an input page. One or more steps of the method 500 may be performed by a template generating service such as the template generating service 114 of FIGS. 1-2, by a local template generating engine and/or by an application such as applications 112/134 of FIG. 1. The method 500 may begin, at 505, and proceed to access a page of a document, at 510. This may occur, for example, when a user submits a request to receive a template based on a title page of the document or when an application after determining that a first page or a title page has been completed, automatically submits a request for generating a template for the document. The request may include a copy of the first page or title page provided via a client device. The page may include a background image, one or more elements such as placeholders, and content (e.g., text inserted in text boxes). In an example, an image of the page is transmitted and/or accessed during the operations of method 500.

An image of the page is provided to a trained ML model as an input, at 515. The trained ML model is an image-to-image transformation model that is trained to receive an image of a page of a document and generate target pages for the document as an output. The target pages may include variations of a background image included in the input page and may also include one or more placeholders for text. In some implementations, each target page has a distinct layout. The target pages are self-consistent and are consistent with the input page. This means that target pages provide a similar look and feel as that of the input page. For example, the target pages may utilize the same or similar color schemes, similar shapes, object, and the like. The ML model may be trained by fine-tuning a pre-trained image-to-image translation model using a training dataset that includes pre-existing templates for a given application such as a presentation application.

Once the image of the input page is provided as an input to the ML model, one or more target pages are received from the ML model as outputs, at 520. In some implementations, the target pages have layouts that are predetermined or that are determined by an ML model trained for predicting the type of layouts that are relevant to the user or the document. This may involve using contextual user or document data to identify relevant layouts for target pages.

After the target pages have been received from the ML model, method 500 proceeds to generate one or more templates from the generated target pages, at 525. The template may be simply a combination of the target pages that are ranked and ordered in an order of preference for display to the user. The generated template is then provided for display on a UI element associated with the document, at 530. This may be done by transmitting the template to the application from which the page or image was received. The template may then be displayed on the UI interface of the application. In an implementation, the template is displayed on a pane adjacent to content pane of the document to enable the user to easily review the template pages and select to add one or apply one to a current page. Once the template is provided for display, method 500 ends at 535.

Figure 6:
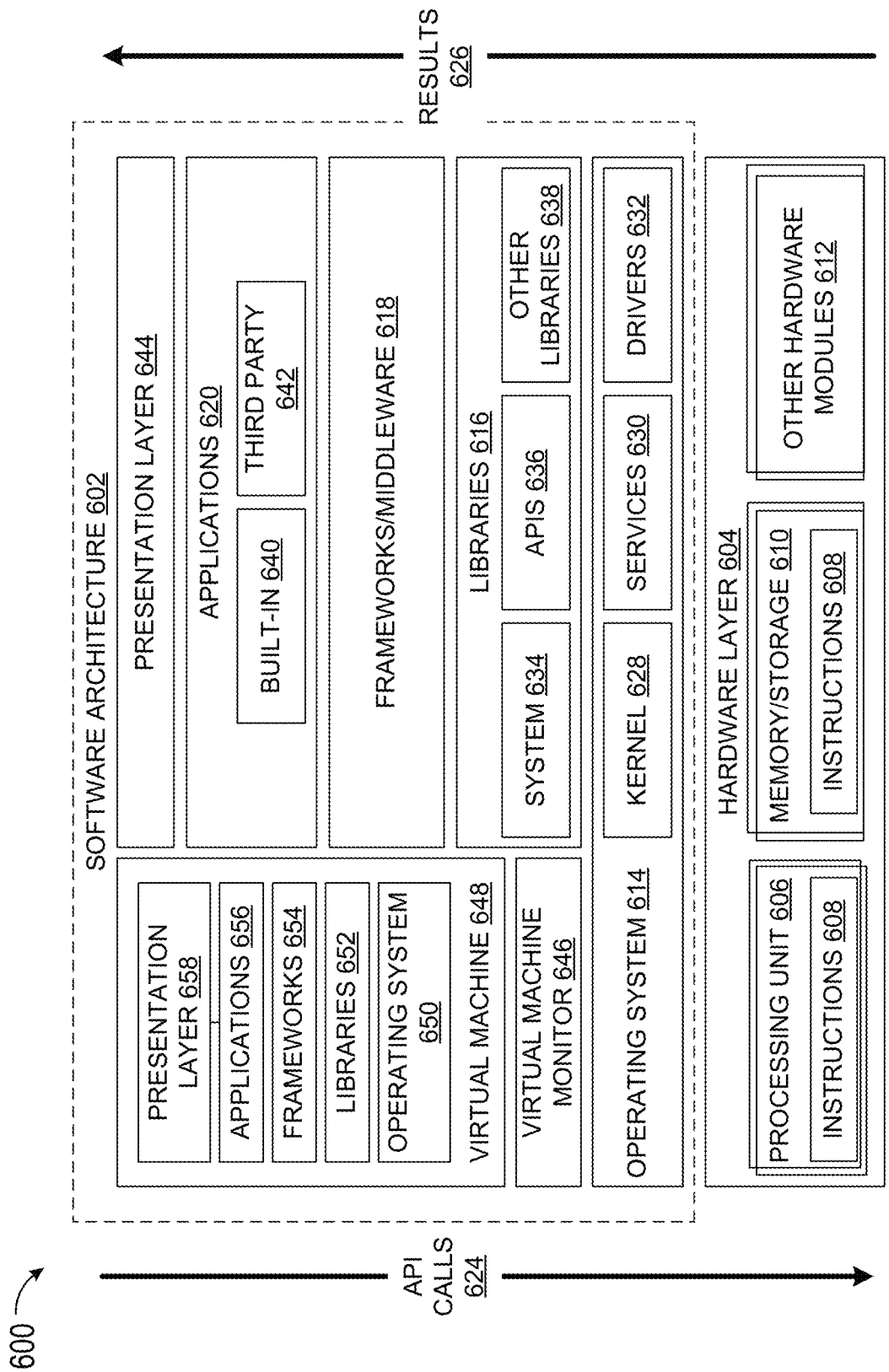
FIG. 6 is a block diagram illustrating an example software architecture, various portions of which may be used in conjunction with various hardware architectures herein described.

FIG. 6 is a block diagram 600 illustrating an example software architecture 602, various portions of which may be used in conjunction with various hardware architectures herein described, which may implement any of the above-described features. FIG. 6 is a non-limiting example of a software architecture, and it will be appreciated that many other architectures may be implemented to facilitate the functionality described herein. The software architecture 602 may execute on hardware such as client devices, native application provider, web servers, server clusters, external services, and other servers. A representative hardware layer 604 includes a processing unit 606 and associated executable instructions 608. The executable instructions 608 represent executable instructions of the software architecture 602, including implementation of the methods, modules and so forth described herein.

The hardware layer 604 also includes a memory/storage 610, which also includes the executable instructions 608 and accompanying data. The hardware layer 604 may also include other hardware modules 612. Instructions 608 held by processing unit 606 may be portions of instructions 608 held by the memory/storage 610.

The example software architecture 602 may be conceptualized as layers, each providing various functionality. For example, the software architecture 602 may include layers and components such as an operating system (OS) 614, libraries 616, frameworks 618, applications 620, and a presentation layer 644. Operationally, the applications 620 and/or other components within the layers may invoke API calls 624 to other layers and receive corresponding results 626. The layers illustrated are representative in nature and other software architectures may include additional or different layers. For example, some mobile or special purpose operating systems may not provide the frameworks/middleware 618.

The OS 614 may manage hardware resources and provide common services. The OS 614 may include, for example, a kernel 628, services 630, and drivers 632. The kernel 628 may act as an abstraction layer between the hardware layer 604 and other software layers. For example, the kernel 628 may be responsible for memory management, processor management (for example, scheduling), component management, networking, security settings, and so on. The services 630 may provide other common services for the other software layers. The drivers 632 may be responsible for controlling or interfacing with the underlying hardware layer 604. For instance, the drivers 632 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 616 may provide a common infrastructure that may be used by the applications 620 and/or other components and/or layers. The libraries 616 typically provide functionality for use by other software modules to perform tasks, rather than rather than interacting directly with the OS 614. The libraries 616 may include system libraries 634 (for example, C standard library) that may provide functions such as memory allocation, string manipulation, file operations. In addition, the libraries 616 may include API libraries 636 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 616 may also include a wide variety of other libraries 638 to provide many functions for applications 620 and other software modules.

The frameworks 618 (also sometimes referred to as middleware) provide a higher-level common infrastructure that may be used by the applications 620 and/or other software modules. For example, the frameworks 618 may provide various graphic user interface (GUI) functions, high-level resource management, or high-level location services. The frameworks 618 may provide a broad spectrum of other APIs for applications 620 and/or other software modules.

The applications 620 include built-in applications 640 and/or third-party applications 642. Examples of built-in applications 640 may include, but are not limited to, a contacts application, a browser application, a location application, a media application, a messaging application, and/or a game application. Third-party applications 642 may include any applications developed by an entity other than the vendor of the particular system. The applications 620 may use functions available via OS 614, libraries 616, frameworks 618, and presentation layer 644 to create user interfaces to interact with users.

Some software architectures use virtual machines, as illustrated by a virtual machine 648. The virtual machine 648 provides an execution environment where applications/modules can execute as if they were executing on a hardware machine (such as the machine depicted in block diagram 700 of FIG. 7, for example). The virtual machine 648 may be hosted by a host OS (for example, OS 714) or hypervisor, and may have a virtual machine monitor 646 which manages operation of the virtual machine 648 and interoperation with the host operating system. A software architecture, which may be different from software architecture 602 outside of the virtual machine, executes within the virtual machine 648 such as an OS 650, libraries 852, frameworks 654, applications 656, and/or a presentation layer 658.

Figure 7:
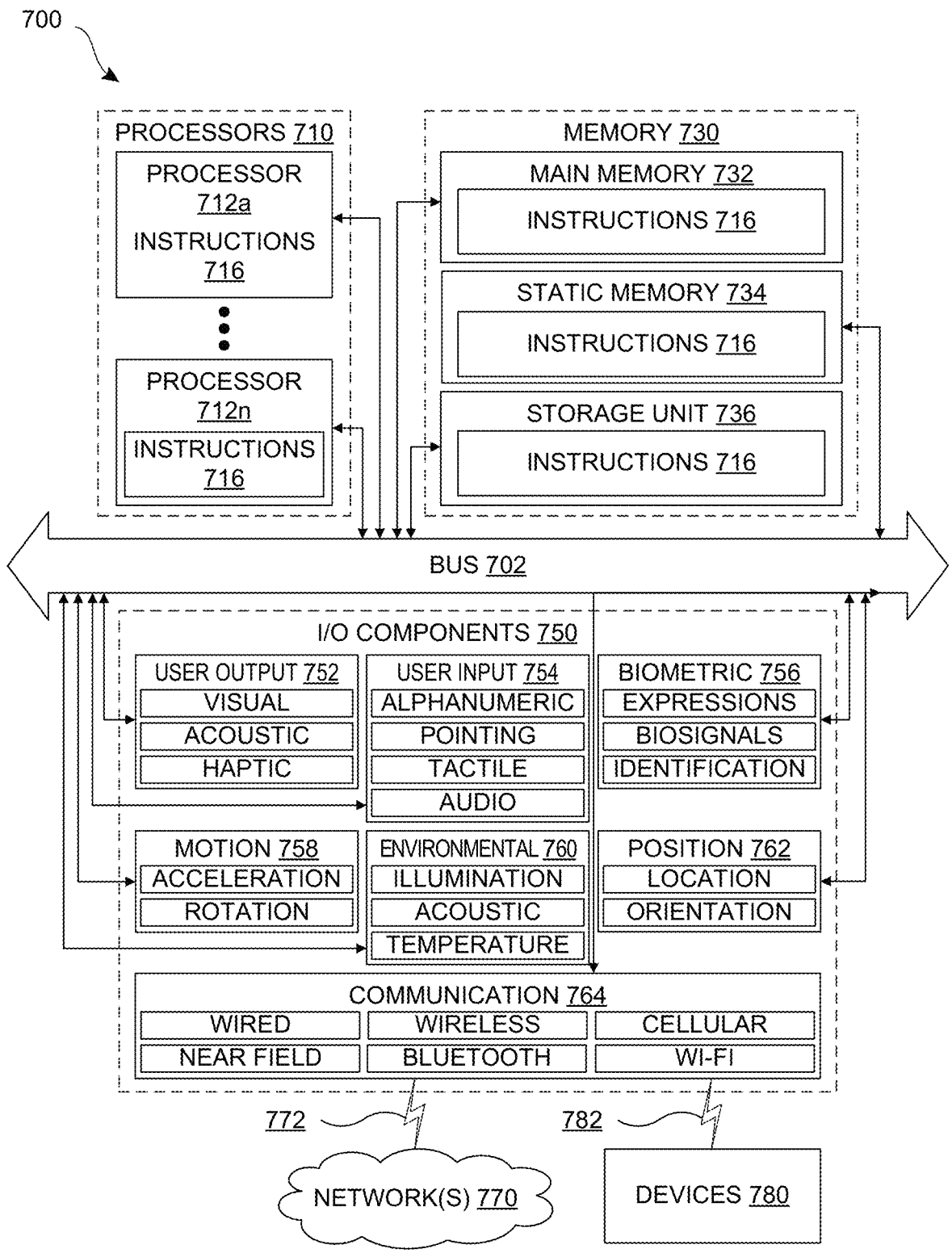
FIG. 7 is a block diagram illustrating components of an example machine configured to read instructions from a machine-readable medium and perform any of the features described herein.

FIG. 7 is a block diagram illustrating components of an example machine 700 configured to read instructions from a machine-readable medium (for example, a machine-readable storage medium) and perform any of the features described herein. The example machine 700 is in a form of a computer system, within which instructions 716 (for example, in the form of software components) for causing the machine 700 to perform any of the features described herein may be executed. As such, the instructions 716 may be used to implement methods or components described herein. The instructions 716 cause unprogrammed and/or unconfigured machine 700 to operate as a particular machine configured to carry out the described features. The machine 700 may be configured to operate as a standalone device or may be coupled (for example, networked) to other machines. In a networked deployment, the machine 700 may operate in the capacity of a server machine or a client machine in a server-client network environment, or as a node in a peer-to-peer or distributed network environment. Machine 700 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 700 is illustrated, the term "machine" includes a collection of machines that individually or jointly execute the instructions 716.

The machine 700 may include processors 710, memory 730, and I/O components 750, which may be communicatively coupled via, for example, a bus 702. The bus 702 may include multiple buses coupling various elements of machine 700 via various bus technologies and protocols. In an example, the processors 710 (including, for example, a central processing unit (CPU), a graphics processing unit (GPU), a digital signal processor (DSP), an ASIC, or a suitable combination thereof) may include one or more processors 712a to 712n that may execute the instructions 716 and process data. In some examples, one or more processors 710 may execute instructions provided or identified by one or more other processors 710. The term "processor" includes a multi-core processor including cores that may execute instructions contemporaneously. Although FIG. 7 shows multiple processors, the machine 700 may include a single processor with a single core, a single processor with multiple cores (for example, a multi-core processor), multiple processors each with a single core, multiple processors each with multiple cores, or any combination thereof. In some examples, the machine 700 may include multiple processors distributed among multiple machines.

The memory/storage 730 may include a main memory 732, a static memory 734, or other memory, and a storage unit 736, both accessible to the processors 710 such as via the bus 702. The storage unit 736 and memory 732, 734 store instructions 716 embodying any one or more of the functions described herein. The memory/storage 730 may also store temporary, intermediate, and/or long-term data for processors 710. The instructions 716 may also reside, completely or partially, within the memory 732, 934, within the storage unit 736, within at least one of the processors 710 (for example, within a command buffer or cache memory), within memory at least one of I/O components 750, or any suitable combination thereof, during execution thereof. Accordingly, the memory 732, 734, the storage unit 736, memory in processors 710, and memory in I/O components 750 are examples of machine-readable media.

As used herein, "machine-readable medium" refers to a device able to temporarily or permanently store instructions and data that cause machine 700 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 716) for execution by a machine 700 such that the instructions, when executed by one or more processors 710 of the machine 700, cause the machine 700 to perform and one or more of the features described herein. Accordingly, a "machine-readable medium" may refer to a single storage device, as well as "cloud-based" storage systems or storage networks that include multiple storage apparatus or devices.

The I/O components 750 may include a wide variety of hardware components adapted to receive input, provide output, produce output, transmit information, exchange information, capture measurements, and so on. The specific I/O components 750 included in a particular machine will depend on the type and/or function of the machine. For example, mobile devices such as mobile phones may include a touch input device, whereas a headless server or IoT device may not include such a touch input device. The particular examples of I/O components illustrated in FIG. 7 are in no way limiting, and other types of components may be included in machine 700. The grouping of I/O components 750 are merely for simplifying this discussion, and the grouping is in no way limiting. In various examples, the I/O components 750 may include user output components 952 and user input components 754. User output components 752 may include, for example, display components for displaying information (for example, a liquid crystal display (LCD) or a projector), acoustic components (for example, speakers), haptic components (for example, a vibratory motor or force-feedback device), and/or other signal generators. User input components 754 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 750 may include biometric components 756, motion components 758, environmental components 960 and/or position components 762, among a wide array of other environmental sensor components. The biometric components 756 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 762 may include, for example, location sensors (for example, a Global Position System (GPS) receiver), altitude sensors (for example, an air pressure sensor from which altitude may be derived), and/or orientation sensors (for example, magnetometers). The motion components 758 may include, for example, motion sensors such as acceleration and rotation sensors. The environmental components 760 may include, for example, illumination sensors, acoustic sensors and/or temperature sensors.

The I/O components 750 may include communication components 764, implementing a wide variety of technologies operable to couple the machine 700 to network(s) 770 and/or device(s) 780 via respective communicative couplings 772 and 782. The communication components 764 may include one or more network interface components or other suitable devices to interface with the network(s) 770. The communication components 764 may include, for example, components adapted to provide wired communication, wireless communication, cellular communication, Near Field Communication (NFC), Bluetooth communication, Wi-Fi, and/or communication via other modalities. The device(s) 780 may include other machines or various peripheral devices (for example, coupled via USB).

In some examples, the communication components 764 may detect identifiers or include components adapted to detect identifiers. For example, the communication components 764 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 762, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-7) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. A data processing system comprising:
a processor; and
a memory in communication with the processor, the memory comprising executable instructions that, when executed by the processor, cause the data processing system to perform functions of:
accessing a page of a document;
providing an image of the page as an input to a trained machine-learning (ML) model, the trained machine-learning model being trained to automatically generate target pages for the document based on the page;
receiving one or more target pages for the document as an output of the ML model, the target pages including a background image and one or more placeholders for content;
generating a template for the document from the one or more target pages; and
providing the template for display on a user interface screen associated with the document.

Item 2. The data processing system of item 1, wherein the page is a title page of the document.

Item 3. The data processing system of any of items 1 or 2, wherein the page includes a background image and one or more text placeholders.

Item 4. The data processing system of any preceding item, wherein the image is provided to the ML model, upon a determination that a user has completed creating the page.

Item 5. The data processing system of any preceding item, wherein the image is provided to the ML model, upon receiving a user request for creating a template based on the page.

Item 6. The data processing system of any preceding item, wherein the trained ML model is an image-to-image translation model for receiving the image as the input and providing a variation of the image as the output.

Item 7. The data processing system of any preceding item, wherein the trained ML model is trained by training a pre-trained ML model with a training dataset which includes pre-existing templates.

Item 8. The data processing system of any preceding item, wherein the document is a presentation document having a plurality of pages.

Item 9. The data processing system of any preceding item, wherein each of the one or more target pages has a distinct layout.

Item 10. A method for generating a template based on a first page of a document comprising:
receiving a request to create the template for the document;
providing a first page of the document as an input to a trained machine-learning (ML) model, the trained machine-learning model being trained to automatically generate target pages for the document based on the first page, the first page including a background image and content;
receiving one or more target pages for the document from the ML model, each target page having a distinct layout and including a modified background image and one or more placeholders for content;
generating a template for the document from the one or more target pages; and
providing the template for display on a user interface screen associated with the document.

Item 11. The method of item 10, wherein the request is received when the first page of the document is complete.

Item 12. The method of any of items 10 or 11, wherein the placeholders are placeholders for entering text.

Item 13. The method of any of items 10-12, wherein the modified background image of each of the one or more target pages are variations of the background image of the first page.

Item 14. The method of any of items 10-13, wherein the modified background image of each of the one or more target pages accommodates the distinct layout of the target page on which it is displayed.

Item 15. The method of any of items 10-14, wherein the request is received from a user and in response the template is displayed to the user, the template providing various pages of the document, the various pages being self-consistent and consistent with the first page.

Item 16. A non-transitory computer readable medium on which are stored instructions that, when executed, cause a programmable device to perform functions of:
receiving an image;
providing the image as an input to a trained machine-learning (ML) model, the trained machine-learning model being trained to automatically generate target pages for a document based on an input image;
receiving one or more target pages for the document as an output of the ML model, the target pages including a background image and one or more placeholders for content;
generating a template for the document from the one or more target pages; and
providing the template for display on a user interface screen associated with the document.

Item 17. The non-transitory computer readable medium of item 16, wherein the image is received from a user and the template is provided for display to the user.

Item 18. The non-transitory computer readable medium of any of items 16 or 17, wherein the one or more placeholders are placeholders for text.

Item 19. The non-transitory computer readable medium of any of items 16-18, wherein the background image of each of the one or more target pages is a variation of the image.

Item 20. The non-transitory computer readable medium of any of items 16-19, wherein the image is a title page image for the document.

In the foregoing detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. A data processing system comprising:
    a processor; and
    a memory in communication with the processor, the memory comprising executable instructions that, when executed by the processor, cause the data processing system to perform functions of:
        accessing a page of a document;
        providing an image of the page as an input to a trained machine-learning (ML) model, the trained machine-learning model being trained to automatically generate target pages for the document based on the page;
        receiving one or more target pages for the document as an output of the ML model, the target pages including a background image and one or more placeholders for content;
        generating a template for the document from the one or more target pages; and
        providing the template for display on a user interface screen associated with the document.

2. The data processing system of claim 1, wherein the page is a title page of the document.

3. The data processing system of claim 1, wherein the page includes a background image and one or more text placeholders.

4. The data processing system of claim 1, wherein the image is provided to the ML model, upon a determination that a user has completed creating the page.

5. The data processing system of claim 1, wherein the image is provided to the ML model, upon receiving a user request for creating a template based on the page.

6. The data processing system of claim 1, wherein the trained ML model is an image-to-image translation model for receiving the image as the input and providing a variation of the image as the output.

7. The data processing system of claim 1, wherein the trained ML model is trained by training a pre-trained ML model with a training dataset which includes pre-existing templates.

8. The data processing system of claim 1, wherein the document is a presentation document having a plurality of pages.

9. The data processing system of claim 1, wherein each of the one or more target pages has a distinct layout.

10. A method for generating a template based on a first page of a document comprising:
    receiving a request to create the template for the document;
    providing a first page of the document as an input to a trained machine-learning (ML) model, the trained machine-learning model being trained to automatically generate target pages for the document based on the first page, the first page including a background image and content;
    receiving one or more target pages for the document from the ML model, each target page having a distinct layout and including a modified background image and one or more placeholders for content;
    generating a template for the document from the one or more target pages; and
    providing the template for display on a user interface screen associated with the document.

11. The method of claim 10, wherein the request is received when the first page of the document is complete.

12. The method of claim 10, wherein the placeholders are placeholders for entering text.

13. The method of claim 10, wherein the modified background image of each of the one or more target pages are variations of the background image of the first page.

14. The method of claim 10, wherein the modified background image of each of the one or more target pages accommodates the distinct layout of the target page on which it is displayed.

15. The method of claim 10, wherein the request is received from a user and in response the template is displayed to the user, the template providing various pages of the document, the various pages being self-consistent and consistent with the first page.

16. A non-transitory computer readable medium on which are stored instructions that, when executed, cause a programmable device to perform functions of:

receiving an image;

providing the image as an input to a trained machine-learning (ML) model, the trained machine-learning model being trained to automatically generate target pages for a document based on an input image;

receiving one or more target pages for the document as an output of the ML model, the target pages including a background image and one or more placeholders for content;

generating a template for the document from the one or more target pages; and providing the template for display on a user interface screen associated with the document.

17. The non-transitory computer readable medium of claim 16, wherein the image is received from a user and the template is provided for display to the user.

18. The non-transitory computer readable medium of claim 16, wherein the one or more placeholders are placeholders for text.

19. The non-transitory computer readable medium of claim 16, wherein the background image of each of the one or more target pages is a variation of the image.

20. The non-transitory computer readable medium of claim 16, wherein the image is a title page image for the document.

* * * * *